US012577014B1

(12) United States Patent
Davis

(10) Patent No.: US 12,577,014 B1
(45) Date of Patent: Mar. 17, 2026

(54) ADAPTIVE ROBOTIC SYSTEM FOR SELECTIVE OPENING OF FLEXIBLE CONTAINERS IN WASTE STREAMS

(71) Applicant: CP MANUFACTURING, LLC, San Diego, CA (US)

(72) Inventor: Nicholas Davis, San Diego, CA (US)

(73) Assignee: CP Manufacturing, LLC, San Diego, CA (US)

( * ) Notice: Subject to any disclaimer, the term of this patent is extended or adjusted under 35 U.S.C. 154(b) by 0 days.

(21) Appl. No.: 19/275,803

(22) Filed: Jul. 21, 2025

(51) Int. Cl.
*G06F 7/00* (2006.01)
*B26D 5/00* (2006.01)
(Continued)

(52) U.S. Cl.
CPC .......... *B65B 69/0008* (2013.01); *B26D 5/007* (2013.01); *B26D 7/0625* (2013.01); *B26D 7/088* (2013.01); *B65B 57/04* (2013.01)

(58) Field of Classification Search
CPC . B65B 35/10; B65B 69/0025; B65B 69/0075; B65B 69/0008; B65B 57/04; B65B 69/00; B65B 69/0033; B65B 69/0041; B65B 69/0091; B65B 35/00; G07F 11/58; B65G 35/00; B65G 49/05; B65G 65/34; B65G 2201/00; B65G 2201/02; B65G 2201/0214;
(Continued)

(56) References Cited

U.S. PATENT DOCUMENTS 5,368,432 A 11/1994 Schoenhard
9,457,474 B1 * 10/2016 Lisso ....................... B26D 1/45
(Continued)

FOREIGN PATENT DOCUMENTS

CN 110723373 A * 1/2020 ............ F15B 21/041
CN 113023004 A * 6/2021 ............ B65B 57/14
(Continued)

OTHER PUBLICATIONS

International Search Report for PCT/US2025/038541 issued on Sep. 24, 2025, 11 pages).

*Primary Examiner* — Yolanda R Cumbess
(74) *Attorney, Agent, or Firm* — Manuel de la Cerra

(57) ABSTRACT

A system for selectively opening flexible containers, such as plastic bags, in a mixed solid waste stream is disclosed, for use in Material Recovery Facilities (MRFs) or other contexts. The system may include a conveyor configured to transport waste, a sensor configured to detect the presence and position of flexible containers, and a multi-degree-of-freedom positioning device that moves a cutting tool relative to the containers. A processor, in communication with the sensor and positioning device, may calculate a cutting path and control the positioning device to execute the cutting operation. The system may utilize various cutting tools, including punches, blades, spades, shovels, and motorized saws, as well as non-contact fluid-based cutting technologies such as air or water jets. Additionally, the system can dynamically adjust the cutting trajectory based on real-time feedback and environmental conditions. The method provides an adaptable solution to open bags without damaging recyclable materials, improving throughput and reducing waste in mixed waste streams.

25 Claims, 11 Drawing Sheets

(51) Int. Cl.

| | |
|---|---|
| ***B26D 7/06*** | (2006.01) |
| ***B26D 7/08*** | (2006.01) |
| ***B65B 57/04*** | (2006.01) |
| ***B65B 69/00*** | (2006.01) |

(58) Field of Classification Search

CPC ........ B65G 2201/0238; B65G 2203/00; B65G 2203/02; B65G 2203/0208; B65G 2203/0225; B65G 2203/0233; B65G 2203/04; B65G 2203/041; B65G 2203/042; B65G 2812/012; B26D 1/00; B26D 1/06; B26D 1/08; B26D 1/12–125; B26D 5/007; B26D 7/0625; B26D 7/088; B26D 5/00; B26D 5/02; B26D 5/04; B26D 5/08; B26D 7/18; B26D 7/1827; B26D 7/1836; B26D 7/0006; B65D 5/02; B65D 5/04; B65D 5/06; B65D 5/08; B65D 5/20; B65D 7/006; B65D 9/00; B65D 11/00; B65D 27/00; B65D 17/00; B65D 17/30; B65D 17/42

USPC .................................................. 700/213, 230

See application file for complete search history.

(56) References Cited

U.S. PATENT DOCUMENTS

| | | | | |
|---|---|---|---|---|
| 2010/0192743 | A1* | 8/2010 | Bridges .................... | B26D 7/22<br>83/56 |
| 2014/0050397 | A1 | 2/2014 | Badholm | |
| 2015/0273528 | A1 | 10/2015 | Sukkar | |
| 2022/0016743 | A1* | 1/2022 | Blaine ..................... | B24C 1/045 |
| 2023/0303342 | A1* | 9/2023 | Kulkarni ................... | B07C 5/36 |
| 2023/0356387 | A1* | 11/2023 | Kalouche ............... | B25J 19/021 |
| 2024/0109103 | A1 | 4/2024 | Kumar et al. | |
| 2025/0074645 | A1 | 3/2025 | Schwaiger | |

FOREIGN PATENT DOCUMENTS

| | | | | | |
|---|---|---|---|---|---|
| CN | 113023008 | A | * | 6/2021 | ......... B65B 69/0008 |
| CN | 120344355 | A | * | 7/2025 | ............ B25J 9/1666 |
| KR | 20240148019 | A | * | 10/2024 | ............... B26D 1/18 |
| WO | WO-2008016313 | A1 | * | 2/2008 | ......... B65B 69/0008 |
| WO | WO-2011057392 | A1 | * | 5/2011 | ................ B26F 3/08 |
| WO | WO-2023086868 | A1 | * | 5/2023 | ............. B65G 65/02 |

* cited by examiner

ADAPTIVE ROBOTIC SYSTEM FOR SELECTIVE OPENING OF FLEXIBLE CONTAINERS IN WASTE STREAMS

CROSS-REFERENCE TO RELATED APPLICATIONS

None

TECHNICAL FIELD

This disclosure relates generally to systems and methods for opening flexible containers such as plastic bags within mixed solid waste streams. In various example embodiments, the disclosure relates to robotic systems that may be configured to detect, target, and selectively open flexible containers in a manner that avoids shredding or damaging their contents, particularly for use in material recovery facilities (MRFs).

BACKGROUND

The statements in this background section are provided to assist with understanding the present disclosure and the applications and uses of various example embodiments, and do not constitute prior art.

Material Recovery Facilities (MRFs) employ screening and sorting machinery to separate incoming solid waste into salable scrap commodities such as paper, plastic, and metal. Inbound waste is frequently enclosed in flexible plastic bags, particularly when it originates from households handling moist materials such as kitchen scraps or residual household waste—collectively referred to as municipal solid waste (MSW).

In a typical MRF handling MSW, 60% to 80% of the inbound waste stream arrives in bagged form. Before this material can be sorted into distinct categories, the contents must be liberated from the bags.

The most common approach is to shred or reduce the entire inbound stream using a material reducer or shredder with large tooth spacing, typically ranging from 8 to 20 inches (200 mm to 500 mm). While this technique opens bags, it also tends to denature the enclosed materials—reducing large pieces of plastic and cardboard into fragments or by mangling their shape.

Denaturing complicates downstream processing, especially as MRFs increasingly rely on neural network-based classifiers trained to identify intact items by size, color, and geometry. When items are shredded, their visual appearance is altered unpredictably, reducing the accuracy of AI-based identification systems.

Shredder configuration imposes a tradeoff: smaller tooth openings destroy material more effectively, while larger openings risk letting intact bags through. Either condition leads to inefficiency.

Shredders also present significant operational and maintenance burdens. Their rotating shafts frequently wrap on flexible materials like linens, ropes, and hoses. Most shredders use sharpened teeth that must be replaced, rotated, or sharpened regularly. The confined spaces inside the shredder are easily jammed by hard or bulky items such as engine blocks, sinks, or bicycles.

Multiple prior systems have attempted to address these issues. For example, U.S. Pat. No. 5,484,247 (Miller et al.) discloses a bag-opening device that uses a set of pull fins to tear apart bags rather than shred the entire contents. However, this device still passes the waste stream through rotating shafts, where the material travels perpendicular to the axis of rotation-creating the same risks of wrapping and fouling.

U.S. Pat. No. 9,611,061 (Eggersmann) describes a system in which tearing elements are mounted on a common axis of rotation but move independently. Bags are opened by opposing tensile force. However, this system is large, mechanically complex, expensive, and prone to jamming. Like other shaft-driven systems, it suffers from wrapping, particularly because the material still flows perpendicular to the rotational axis.

U.S. Pat. No. 5,443,347 (Davis) proposes a screw-based approach that avoids rotating shafts and reduces content damage. However, the system forces all material through a confined passage, which remains vulnerable to jamming by oversized or rigid objects. For this reason, such devices are generally used downstream of mechanical screening equipment, where it is assumed that large items have already been removed.

However, because 60% to 80% of inbound material remains bagged even after screening, opening bags downstream is too late to prevent clogging of the mechanical separator's overs line. The unliberated bags continue to bypass separation, reducing recovery rates.

Despite extensive attempts in the art, there remains a need for a bag-opening system that can operate on unsorted material without shredding contents, that resists jamming by hard or bulky objects, and that enhances—not impairs—the effectiveness of AI-based downstream sorting.

SUMMARY OF THE INVENTION

Provided in various example embodiments are automated systems and methods for opening flexible containers such as plastic bags in material recovery facilities (MRFs). These systems may address multiple longstanding challenges in solid waste handling, including denaturing of recyclables, jamming of mechanical components, and disruption of downstream sorting technologies.

The disclosed systems and methods may support improved throughput, reliability, and classification performance. In various implementations, systems may detect and identify flexible containers in a moving mixed waste stream, compute appropriate trajectories for opening those containers, and perform selective cutting using robotic motion. The system may be configured to adapt to different bag types, speeds, tool preferences, and downstream processing goals, thereby enabling clean, non-destructive opening of flexible containers such as bags.

A machine configured to cut flexible containers such as bags, and an associated method, are disclosed comprising a sensor mechanism, a computer controller, a robotic positioning mechanism, and a cutting mechanism configured to selectively cut bags without contacting large jamming objects.

In various example embodiments, a visual camera may identify plastic bags using a neural network-based classifier. Additionally, a depth or profiling sensor, such as a LIDAR-based material profiler, may determine the location and height of the bags. The computer controller may use this information to calculate an ideal cutting location or cutting path for the cutting mechanism, based on the bag's position, height, orientation, and speed.

A typical infeed conveyor may operate at approximately 200 feet per minute, for example. In such a system, unbagged material typically has a burden depth of about two to four inches, while bagged material is usually rises to approximately 24 inches above the belt. In these types of configurations, a profiling sensor may be adequate for detecting inbound bags.

In one embodiment, a blade may be used to puncture and cut the bag. The robotic positioning system may move the blade through the bag and rotate along the path of the bag. In this embodiment, the blade may be a dual-edged leaf-shaped blade, similar to a spear. The blade pierces the bag, cuts in either direction along its cutting edge, and then retracts. The leaf shape provides a bladed edge on the retracting side, allowing it to pull free from any entanglements.

In another embodiment, a spade-shaped blade may be used. This blade may be sufficiently wide to cut through a significant portion of the bag without requiring lateral movement. This configuration allows faster bag opening and prevents material from becoming entangled with the blade as it moves through the material stream.

In an example embodiment, a linear thrust device may be used to pierce the bag. This device could include a pneumatic actuator, a hydraulic actuator, or a linear actuator. The linear actuator allows the blade to move forward and backward more rapidly compared to a typical robotic positioning system, such as a six-axis robot.

In a further example embodiment, the cutting system may be equipped with a pressurized air blower. The blower may pretension and hold the surface of the plastic bag prior to piercing, ensuring the surface remains stationary when pierced. The blower may also strip off any items that become entangled with the blade.

In another example embodiment, a motorized blade may be employed, such as a reciprocating saw or a cutoff wheel. This allows the blade to actively cut the plastic film, making the cutting device less reliant on the movement of the robotic positioning system. However, such motorized blades may become obstructed by loose plastic film during operation. It is important to use air to maintain the bag's surface tension and to remove any fouling plastic film to maintain optimal cutting functionality.

In an example embodiment, an angle grinder with a cutoff wheel may be used. This configuration aligns the cutting wheel with the bag's direction of travel, and the return arc of the blade may be aligned with an air blower for clearing debris.

Compressed air, when applied at approximately 90 psi with a clearance of one-half inch, may begin to puncture typical plastic films.

In a further example embodiment, a non-contact cutting method may be utilized, such as pressurized fluid (e.g., compressed air or high-pressure water). Compressed air at approximately 300 psi, forced through an opening of 0.085 inches, may be sufficient to cut through plastic film at a half-inch clearance. To achieve consistent clearance, a high-resolution profiling sensor may be required.

In various example embodiments, high-pressure water may be used to cut plastic film from greater distances. For example, a 2.5-gallon-per-minute nozzle at 3000 psi may cut plastic film from six inches or more. However, this amount of water may increase the moisture content of recyclable materials, which can degrade their quality.

Additionally, abrasive media, such as silica or garnet sand, may be mixed with fluids to increase cutting power. While abrasives are not typically necessary to cut plastic with high-pressure water, they can enhance the effectiveness of compressed air, allowing greater clearance from the cutting surface and easier route planning for the robotic controller. However, abrasive media tends to end up in the fines fraction of a material recovery facility (MRF), which may impact system performance. Use of abrasive media may be avoided to minimize wear on hydrocyclones used in MRFs.

In various example methods for opening bags, a heterogeneous mixture of materials, including bagged material, may be continuously fed onto a conveyor. The conveyor may move the material through a sensor system, such as a LIDAR-based sensor capable of creating a material profile. The sensor system may feed data to a processor, which may identify bags within the material stream and constructs a profile of the items identified as bags. The processor may prioritize bags for cutting, calculate ideal cutting contours for each bag's surface, and compute the time required to cut along the contours. The processor may also compute the conveyor speed to generate a travel path for the robotic positioning system to follow the contour on the moving bag. The processor may then instruct the robotic positioning system to travel to the computed intercept point and initiate cutting along the calculated travel path.

When cutting with compressed air, a clearance of approximately 0.25 inches from the bag surface may be used without making contact, as any contact may alter the bag's position, which could affect the cutting contour. When cutting with water, the water stream should be as narrow as possible to avoid applying force outside the cut, which could move the bag or nearby bags. Any movement of bags downstream of the sensor system can disrupt the opening process.

After cutting along the travel path, the next priority bag may be targeted. The processor may compute a new intercept point and cutting time, ideally minimizing delays. The processor may instruct the robotic positioning system to travel to the intercept point and follow the computed travel path while cutting along the calculated contour. The system may continue to prioritize bags, compute contours, intercept points, times, and travel paths as long as material continues to be fed onto the conveyor and bags remain within the reach of the robotic positioning system.

In various example embodiments, a system may include a conveyor configured to transport a heterogeneous mixture of materials including at least one flexible container; a sensor configured to detect the presence and position of the at least one flexible container on the conveyor; a multi-degree-of-freedom positioning device configured to move a cutting tool relative to the conveyor; and a processor in communication with the sensor and the positioning device, the processor configured to process sensor data to locate the flexible container, determine a cutting trajectory for opening the flexible container, and control the positioning device to execute the cutting trajectory to open the flexible container.

In various example embodiments, the positioning device may include a quick-change interface configured to mount different cutting tools.

In various example embodiments, the processor may be configured to select the cutting tool based on characteristics of the flexible container.

In various example embodiments, the processor may be configured to detect an obstruction and halt movement of the cutting tool.

In various example embodiments, the processor may be configured to prioritize cutting of the flexible container based on height relative to the conveyor.

In various example embodiments, the processor may be configured to calculate intercept points based on speed of the flexible container and conveyor rate.

In various example embodiments, the processor may be configured to dynamically adjust the cutting trajectory in real-time based on changing sensor input.

In various example embodiments, the cutting tool may include a rotary saw or a motorized blade.

In various example embodiments, the cutting tool may include a high-pressure fluid nozzle.

In various example embodiments, the high-pressure fluid may include a suspended cutting medium.

In various example embodiments, the system may be configured to maintain a clearance from the cutting tool to a surface of the flexible container of less than 0.5 inches.

In various example embodiments, the system may include a blower configured to pretension a surface of the flexible container prior to cutting.

In various example embodiments, the system may be configured to prevent fouling of the cutting tool using a directed air stream synchronized with cutting tool retraction.

In various example embodiments, the system may include a feedback loop configured to receive downstream classification confidence and adjust cutting behavior.

In various example embodiments, the cutting tool may be configured to perform cutting without physical contact with the flexible container.

In various example embodiments, a method for opening flexible containers may include conveying a heterogeneous mixture of materials including at least one flexible container on a conveyor; using a sensor to detect a presence and position of the flexible container; calculating a cutting trajectory for the flexible container based on sensor data; directing a multi-degree-of-freedom positioning device to move a cutting tool along the cutting trajectory; and opening the flexible container using the cutting tool while avoiding damage to contents of the flexible container.

In various example embodiments, the method may include using a high-pressure fluid jet as the cutting tool.

In various example embodiments, the method may include directing a blower to pretension a surface of the flexible container before cutting.

In various example embodiments, the method may include calculating and executing a re-intercept trajectory if a first cutting attempt fails.

In various example embodiments, the method may include executing a cutting trajectory that avoids any contact with a surface of the flexible container.

In various example embodiments, the method may include guiding the positioning device based on both static sensor data and dynamic motion prediction.

The embodiments described in this summary are merely illustrative examples of various aspects that may be employed. These examples are not intended to limit the scope of the invention, which is defined solely by the claims. Various modifications, alternatives, and additional or different embodiments may be made without departing from the scope of the claims.

BRIEF DESCRIPTION OF THE DRAWINGS

The accompanying drawings, which are incorporated in and constitute part of this specification, illustrate example embodiments and together with the description, explain various principles of the disclosed embodiments. For clarity, simplicity, and flexibility, not all elements, components, or specifications are defined in all drawings. Not all drawings corresponding to specific steps or embodiments of the present invention are drawn to scale. Emphasis is instead placed on illustration of the nature, function, and product of the system and method described herein.

Embodiments described herein are exemplary and not restrictive. Embodiments will now be described, by way of examples, with reference to the accompanying drawings, in which.

DETAILED DESCRIPTION

Figure 1:
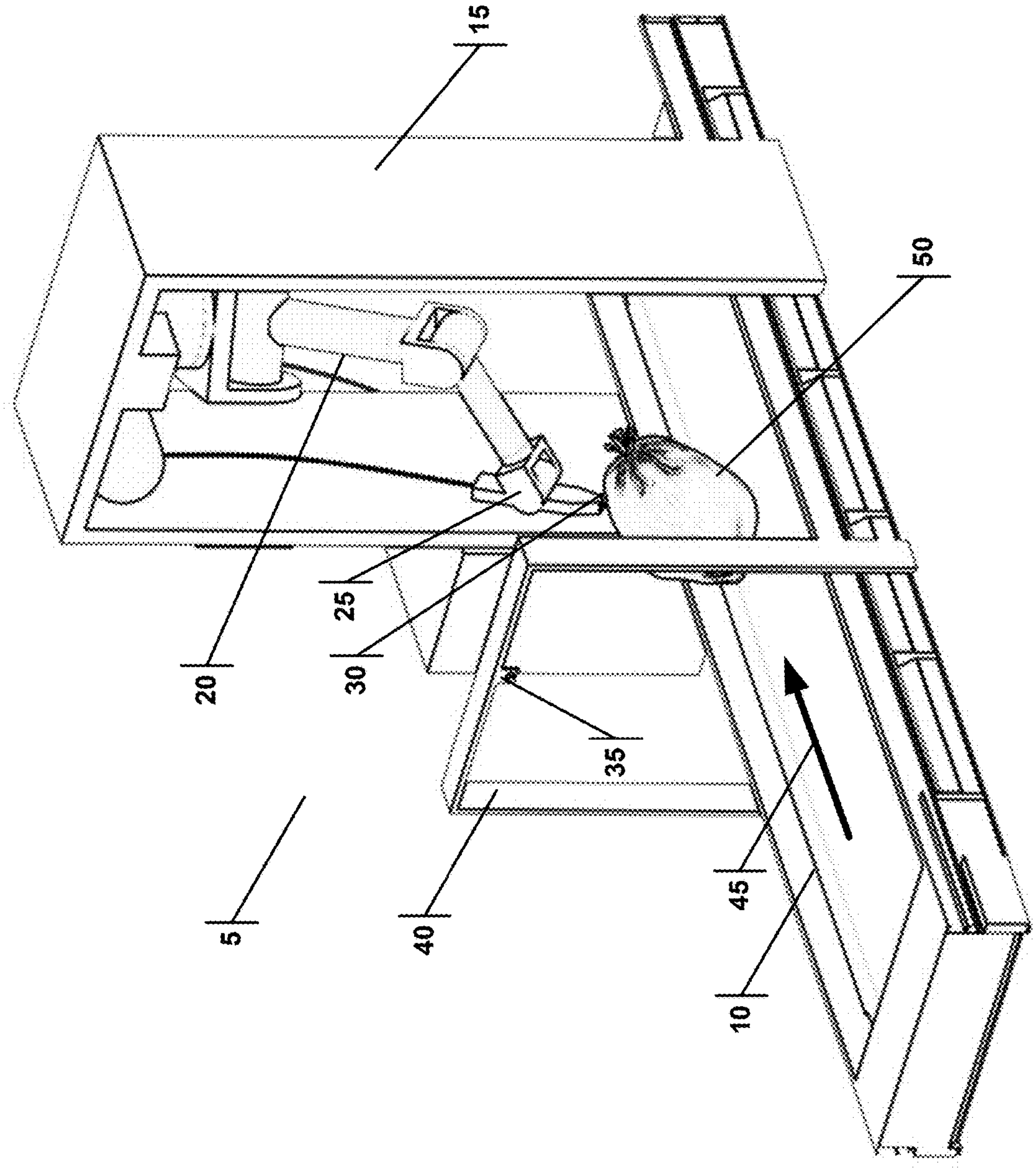
FIG. 1 is an isometric view of an example bag cutting system, showing the conveyor, sensor, robotic positioning arm, and cutting tool.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 2:
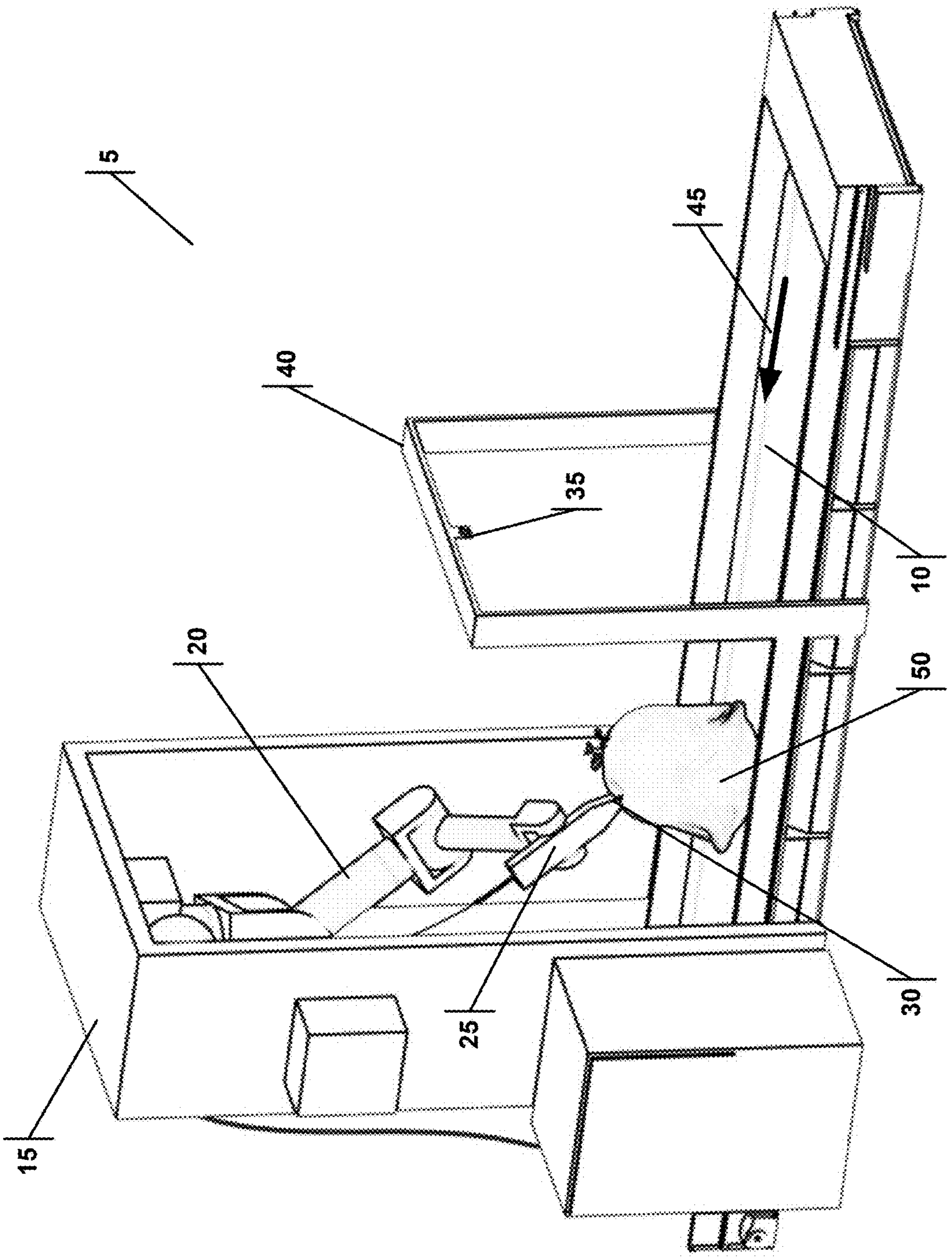
FIG. 2 is a reverse perspective view of the system shown in FIG. 1, illustrating the tool engaging with a flexible container on the conveyor.
Figure 3:
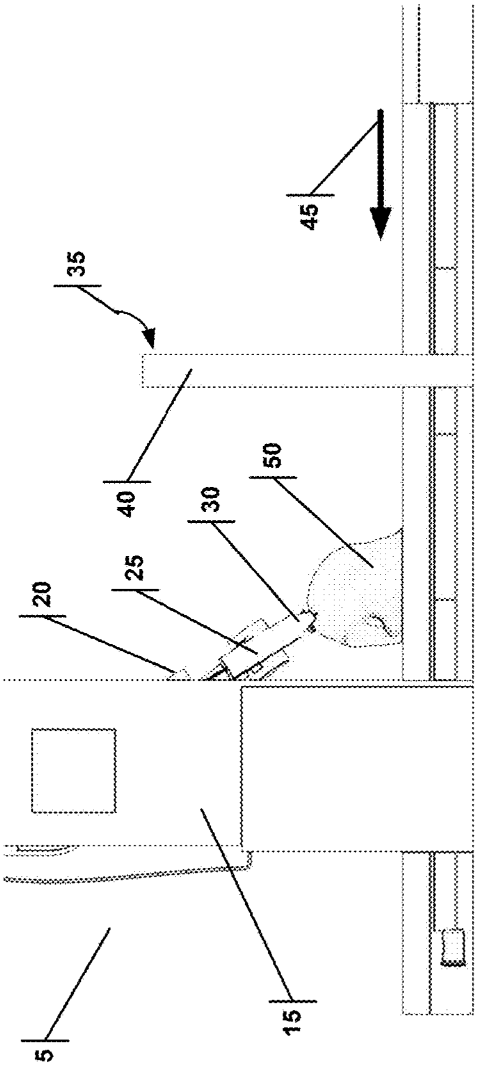
FIG. 3 is a side view of the system during tool descent toward a bag on the conveyor.
Figure 4:
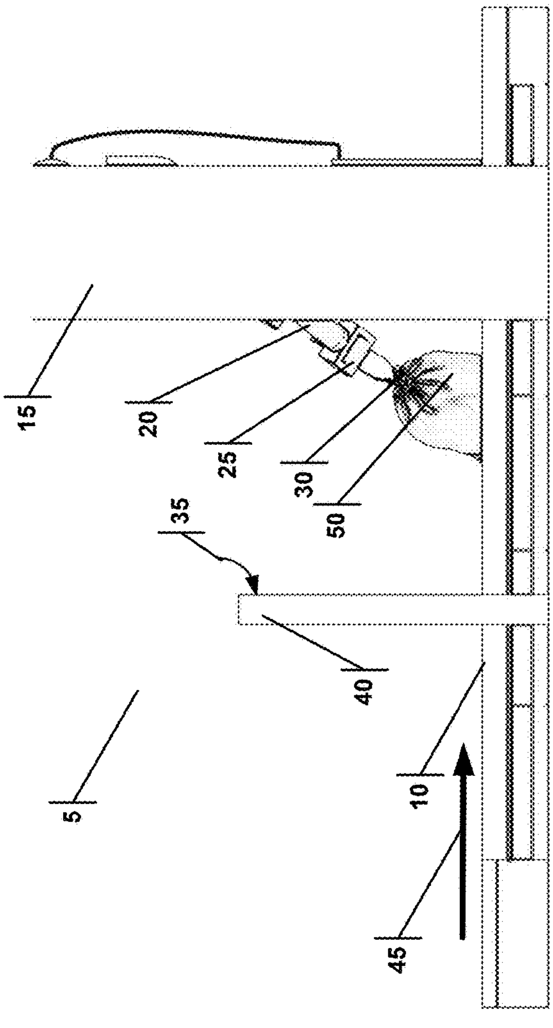
FIG. 4 is a front view of the system with the cutting tool aligned above the flexible container.
Figure 5:
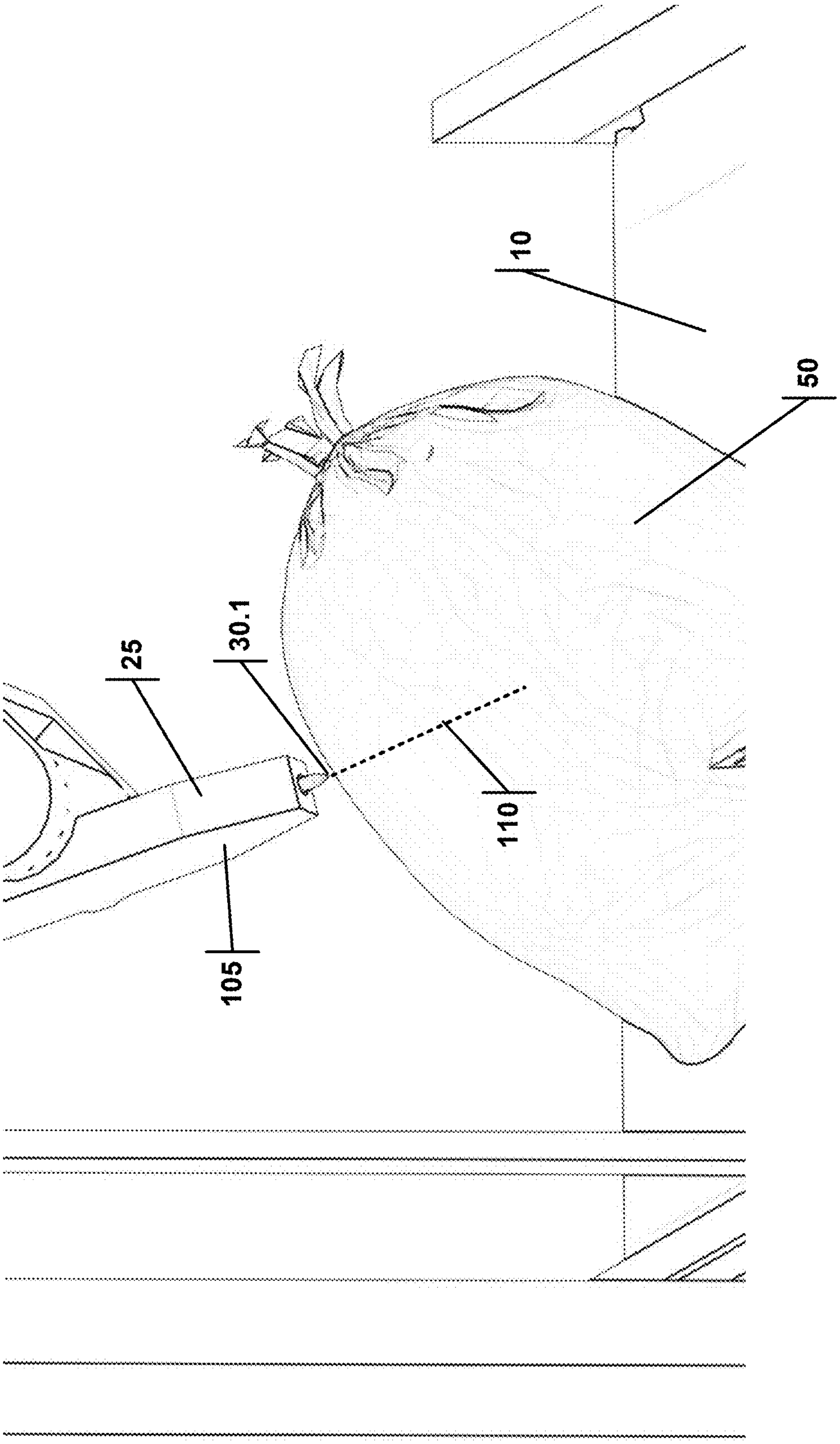
FIG. 5 is a close-up view of the cutting tool approaching the bag surface, illustrating vertical penetration alignment.
Figure 6:
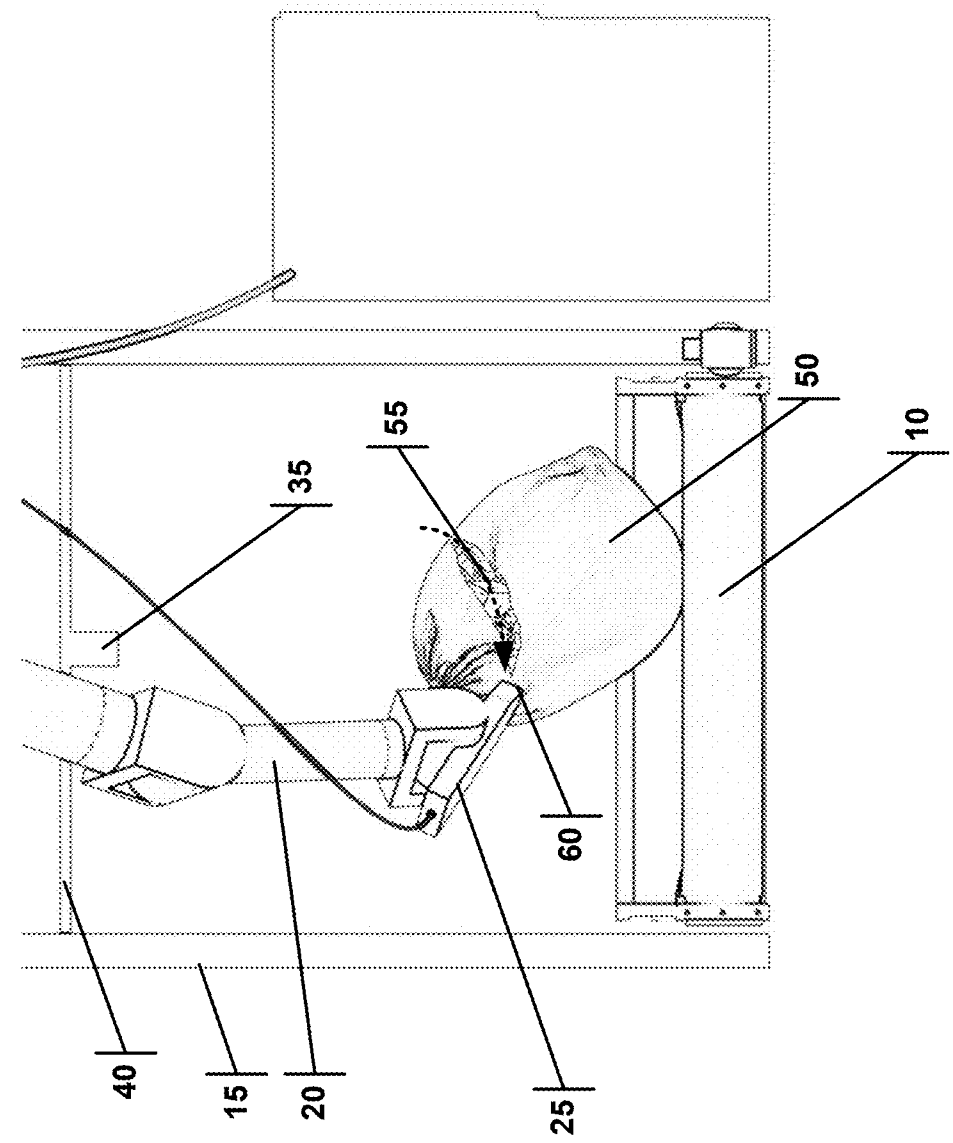
FIG. 6 is a front view showing the cutting tool initiating a slicing action across a flexible container surface.
Figure 7:
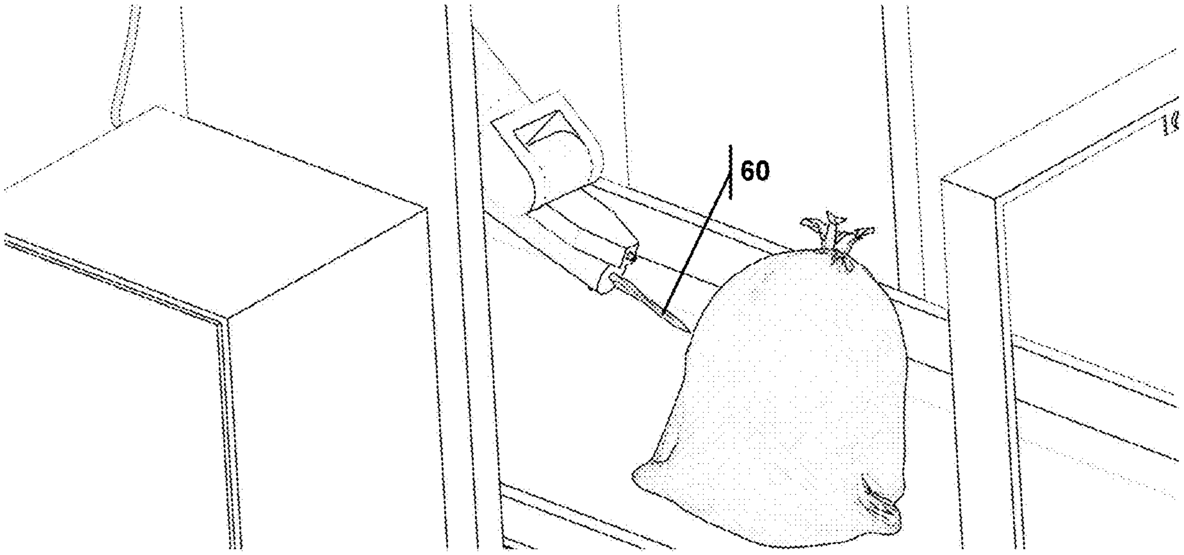
FIG. 7 is an isometric view of an alternative cutting tool comprising a fixed blade, positioned above the flexible container.
Figure 8:
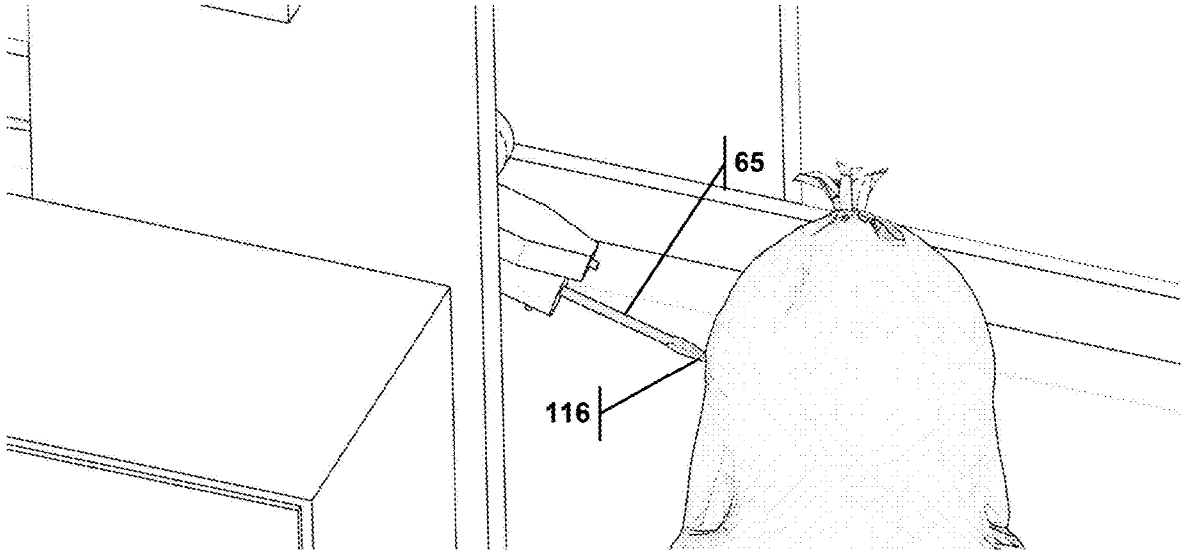
FIG. 8 is an isometric view of another alternative cutting tool comprising a spade-shaped blade, positioned above a flexible container.
Figure 9:
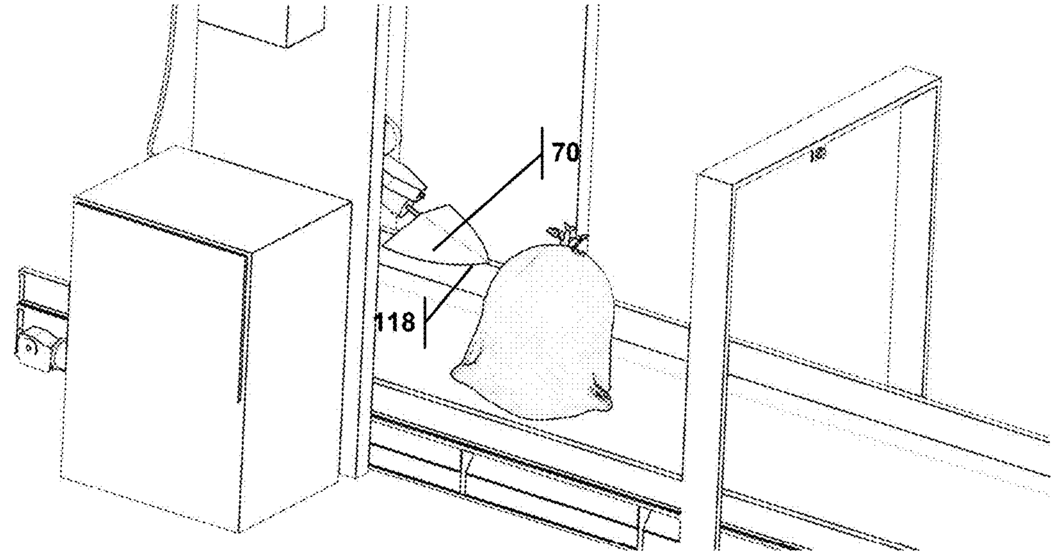
FIG. 9 is an isometric view of an angled shovel blade positioned above the bag.
Figure 10:
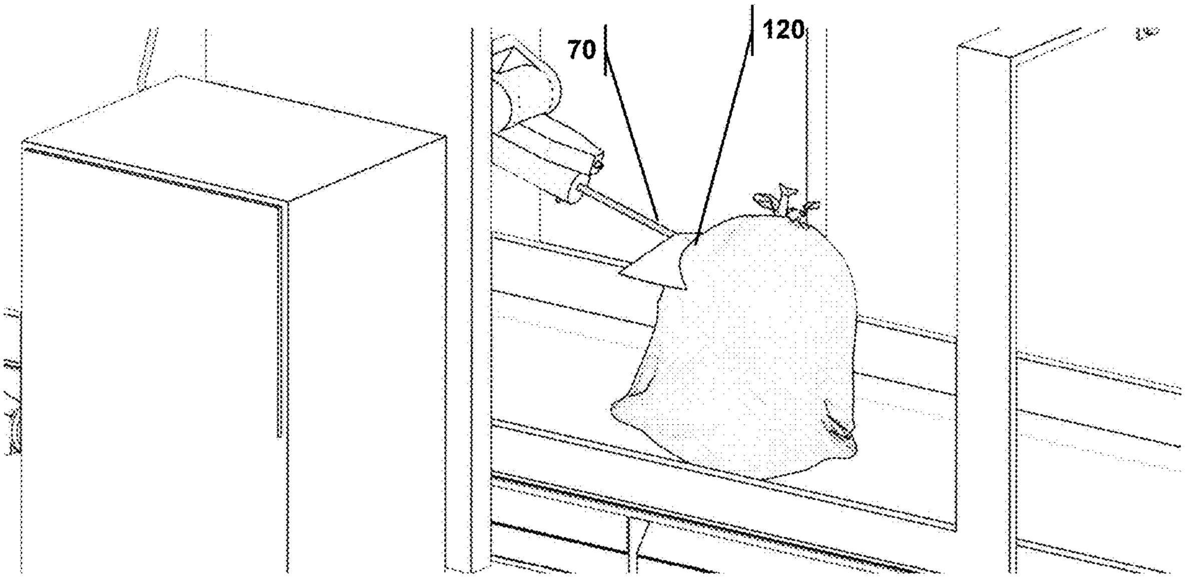
FIG. 10 is a view of the shovel blade shown in FIG. 9 contacting and cutting into the flexible container.
Figure 11:
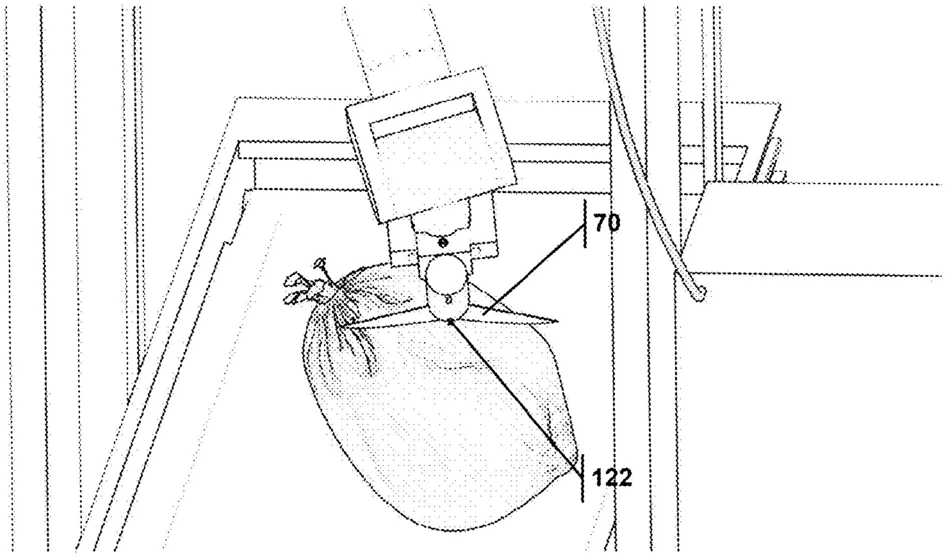
FIG. 11 is a close-up view of dual-blade shovel engagement with a flexible container.

The following list of example features corresponds with the attached figures and is provided for ease of reference, where like reference numerals designate corresponding features throughout the specification and figures:

FIG. 1—Example bag cutting system
5—Bag cutting system
10—Conveyor
15—Positioning Device support frame
20—Positioning Device
25—Tool head
30—Punch tool
35—Sensor (vision/LIDAR)
40—Sensor support frame
45—Trajectory path (visualized)
50—Flexible container (bag)
FIG. 2—Tool and conveyor alignment
Same as FIG. 1.
FIG. 3—Tool approaching bag
Same as FIG. 1, plus:
FIG. 4—Front view of tool over bag
Same as FIG. 3.
FIG. 5—Close-up of blade tip descending
105—Actuator (linear or pneumatic)
30.1—Punch Tool tip
110—Penetration alignment axis
FIG. 6—Blade slicing action across bag
60—Blade tool
55—Cut trajectory direction
FIG. 7—Fixed blade cutting tool
60—Flat blade housing
115—Tool base bracket
FIG. 8—Spade cutting tool
65—Spade head
116—Spade edge
FIG. 9—Shovel tool positioned above bag
70—Shovel blade
118—Leading shovel edge
FIG. 10—Shovel tool engaging bag
70—Shovel blade
120—Penetration depth
FIG. 11—Dual-blade shovel view
70—Shovel blades (left/right)
122—Inter-blade gap
FIG. 12—Motorized rotating cutter
75—Motorized blade
125—Drive housing
FIG. 13—System schematic
100—Processor
130—Trajectory logic module
145—Downstream classifier feedback line
150—Re-intercept planner
155—Tool selection logic
FIG. 14—Flowchart of example detection and cutting process
1400—Example detection method
1410—Detect item on a conveyor device
1420—Classify item as flexible container or not
1430—If flexible container, then construct spatial positioning of flexible container on
conveyor relative to conveyor movement
1440—Determine a cutting priority order for the flexible container
1450—Determine a contour for cutting the flexible container
1460—Determine time the cutter will reach the flexible container
1470—Determine cut path for bag based on cut contour, starting time and position to cut and ending time and position to cut
1480—Execute cut path
1490—Determine whether service area is clear of unopened flexible containers This description outlines example system components and how they work together in various example embodiments. Other example embodiments may include fewer, additional, or different components and features as would be apparent to persons of skill in the art. With reference to the figures and the identified example elements, example embodiments are now described in detail.

General Overview

The present disclosure relates in various example embodiments to systems and methods that may be used for selectively opening flexible containers (50), such as plastic bags, within a mixed solid waste stream, for example for use in Material Recovery Facilities (MRFs). The system may utilize a conveyor (10) to transport bagged waste and may employ sensors (35), actuators (105), and robotic positioning devices (20) to detect, cut, and open these bags without damaging the recyclable contents. The cutting system may be equipped with various tools, including blades (60), punches (30), and non-contact cutting devices like fluid jets (12), with flexible configurations depending on operational needs.

System Configuration

In various example embodiments, as shown in FIG. 1, a bag cutting system (5) may be positioned adjacent to a conveyor (10). The conveyor may be configured to move a heterogeneous mixture of materials, including at least one flexible container (50), which may be a plastic bag containing waste. A sensor (35) may be positioned adjacent to the conveyor to detect the presence and position of the flexible container (50). The sensor may include various types of devices, such as LIDAR-based profiling sensors, visual cameras, or a combination of both (as shown in FIG. 2). These sensors may work together with a processor (100) to detect bags in real-time and assess their positions on the conveyor.

Positioning Device and Cutting Mechanism

The positioning device (20), which may be a multi-degree-of-freedom robotic arm, such as a 6-axis arm or a gantry, may be responsible for accurately positioning the cutting tool (25) relative to the flexible container (50). In various example embodiments, the positioning device (20) may be equipped with a quick-change interface (as described in FIG. 5) to allow easy swapping of cutting tools based on material type or operational requirements. The positioning device (20) may also be equipped with an actuator (105) that may be configured to move the cutting tool (e.g., punch, blade, or fluid nozzle) along a cutting path, for instance as calculated by the processor (100). The actuator may be a pneumatic actuator, a hydraulic actuator or a linear actuator.

Cutting Tools and Operation

In various example embodiments, the cutting tool (25) may include a punch (30), blade (60), spade (65), or motorized saw (75) depending on the needs of the specific application. The choice of cutting tool may depend on factors such as, for example, the type of material being cut, the speed of the conveyor, or the amount of precision required. The system may also include a high-pressure fluid nozzle (12) that expels a gas, such as air, or a liquid, such as water, or a slurry, or functionally similar medium, providing a non-contact cutting option for more delicate materials or when maintaining separation between the cutting tool and the flexible container is necessary (see FIG. 12A). For fluid-based cutting, suspended cutting media, such as grit, may be used in the liquid or slurry to enhance the cutting process, but it is typically avoided in organic waste streams due to its effect on downstream systems.

Actuator and Cutting Tool Interaction

The actuator (105) may be a key component in controlling the movement of the cutting tool (25). In various example embodiments, the actuator (105) may be configured to move the cutting tool (e.g., punch (30), blade (60), spade (65), shovel (70), or motorized saw (75)) along a calculated cutting trajectory. The actuator may be selected from a range of types, including pneumatic actuators, hydraulic actuators, and linear actuators, depending on the specific cutting requirements and the material being processed.

Pneumatic actuators (105), in particular, may be configured to provide linear thrust through compressed air (10). These actuators may move the cutting tool quickly and with precision, allowing for rapid adjustments during the cutting process. The pneumatic actuator may be ideal when high-speed motion is needed to quickly engage the cutting tool with the flexible container (50), especially when using tools like the punch (30) or motorized saw (75), which require fast motion to slice through bagged materials.

Hydraulic actuators (105) offer greater force output compared to pneumatic systems and may be preferred for tougher cutting tasks, such as when working with thicker or more robust bag materials. A hydraulic actuator may be particularly useful for applications that require precise, high-force movement, such as operating the spade-shaped cutting tool (65) or the shovel tool (70). A hydraulic system provides controlled motion and the ability to exert force, which may be useful for maintaining alignment and cutting accuracy.

Linear actuators (105) are another option, offering precise and consistent motion. These actuators provide straightforward forward-and-backward movement, making them ideal for piercing tools like the punch (30), which requires linear insertion to puncture and cut through the flexible container (50). The linear actuator provides the speed and accuracy needed for these tasks, ensuring that the tool performs without excessive resistance or deviation from the cutting path.

The processor (100) works in conjunction with the actuator (105) to dynamically control the movement of the cutting tool based on sensor data and cutting trajectory calculations. For example, if the system detects a change in bag material or speed, the actuator is instructed to adjust the cutting tool's path to maintain accuracy, ensuring that the cutting tool (25) follows the cutting trajectory (112) precisely, as calculated by the processor.

Fluid-Based Cutting, PSI Specifications, and Feedback Integration

Figure 12:
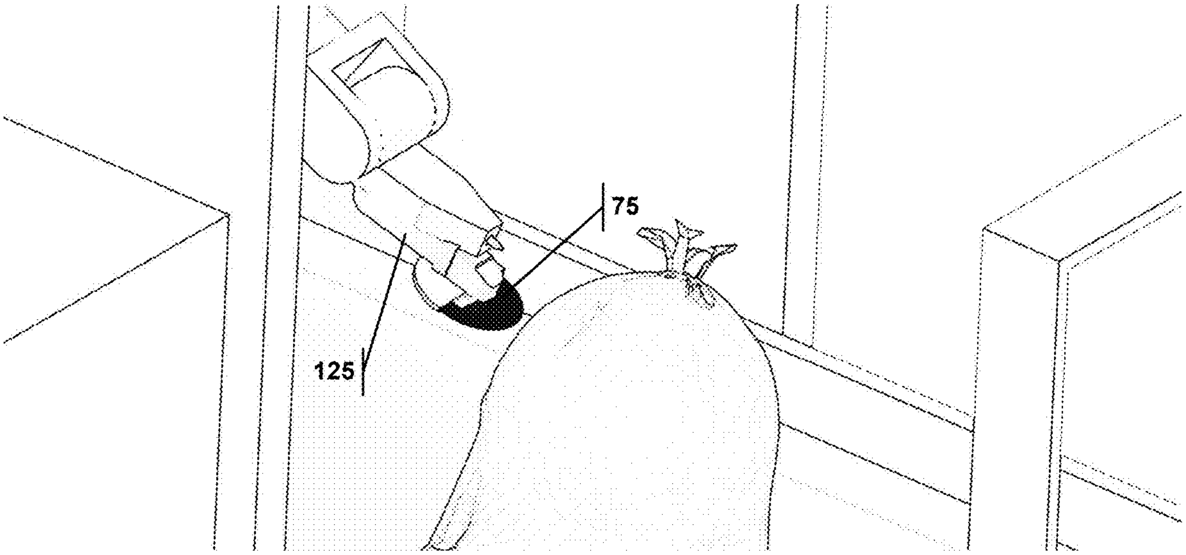
FIG. 12 is an isometric view of a motorized rotating cutting tool configured to slice across a flexible container surface.
Figure 12A:
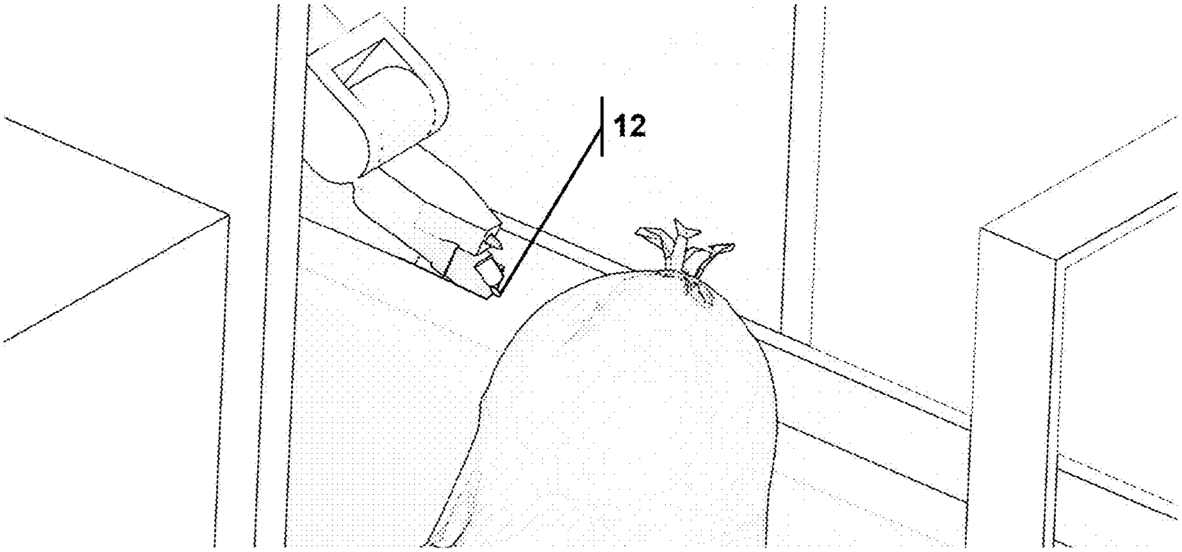
FIG. 12A is an isometric view of a fluid-jet nozzle cutting tool configured to slice across a flexible container surface.

As shown in FIG. 12A, fluid-based cutting technologies, including air or water jets, may provide a non-contact alternative to traditional mechanical tools. The high-pressure fluid nozzle (12) may be capable of cutting through plastic bags (50) with minimal physical interaction, reducing wear on the cutting tool and preserving the contents of the flexible container (sometimes referred to herein as a "bag"). This method ensures that recyclable materials inside the bag are not damaged. The fluid jet (12) may be configured to use either compressed air or high-pressure water, offering flexible cutting capabilities.

In various configurations, the high-pressure fluid nozzle (12) expels compressed air at a pressure of at least 100 psi in some embodiments, or water at a pressure of at least 3,000 psi to perform cutting operations. In other example embodiments the high-pressure fluid nozzle (12) expels compressed air at a pressure that is at least 50 psi, 150 psi, or 200 psi, or water at a pressure that is at least 1,000 psi, 2,000 psi, or 4,000 psi, to perform cutting operations. The fluid nozzle (12) provides a precise and controlled fluid stream, allowing for effective cutting without physical contact. In some embodiments, compressed air (10) is used for cutting plastic film from approximately 0.25 inches to 0.5 inches, enabling the cutting tool (25) to open the flexible container (50) without physically touching its contents, thus preserving the material inside. Compressed air at 100 psi is sufficient to initiate the cutting process and can act as a high-velocity cutting tool in configurations where speed is critical.

In other embodiments, high-pressure water (12) at 3,000 psi is used for more aggressive cutting needs, especially when dealing with tougher, thicker, or more robust bag materials. Water at 3,000 psi easily cuts through plastic bags from a distance of up to six inches, providing a non-contact cutting solution with significantly greater clearance. The high-pressure water stream efficiently slices through the flexible container (50) without significant material disruption, ensuring minimal damage to the contents inside. This method is particularly useful for cutting through thicker, more durable bags, while maintaining separation between the cutting tool and the flexible container (50).

A cutting medium (13), such as grit or abrasive particles, may be added to either compressed air or high-pressure water to enhance cutting performance. For harder to cut containers and/or container locations, the volume and pressure of the high-pressure water (12) jet, which may include a cutting medium (13) can be adjusted by adjusting pump pressure or cutting aperture.

However, the use of abrasive media is typically avoided in organic waste streams, as its inclusion may increase wear on processing equipment and complicate downstream waste treatment systems, particularly in Material Recovery Facilities (MRFs). For example, abrasive media, when used, tends to collect in the fines fraction of the waste stream, which is typically high in organic content. This can complicate the treatment process, particularly by increasing wear on hydrocyclones used to remove abrasive particles from organic waste slurry before it enters anaerobic digesters.

In some configurations, cutting tools (25), such as blades (60), punches (30), and spades (65), may be used in conjunction with fluid-based cutting technologies. These non-contact methods allow the system to achieve precise and consistent cuts while maintaining the integrity of the recyclable materials inside the bag. The fluid jet (12) can be used in conjunction with tools like the punch (30) or blade (60) to enhance cutting performance without introducing any physical wear or contamination to the contents of the bag. Similarly, fluid jets (12) can be utilized alongside motorized saws (75) or spade-shaped blades (65) to achieve clean and efficient cuts on tougher materials.

Figure 13:
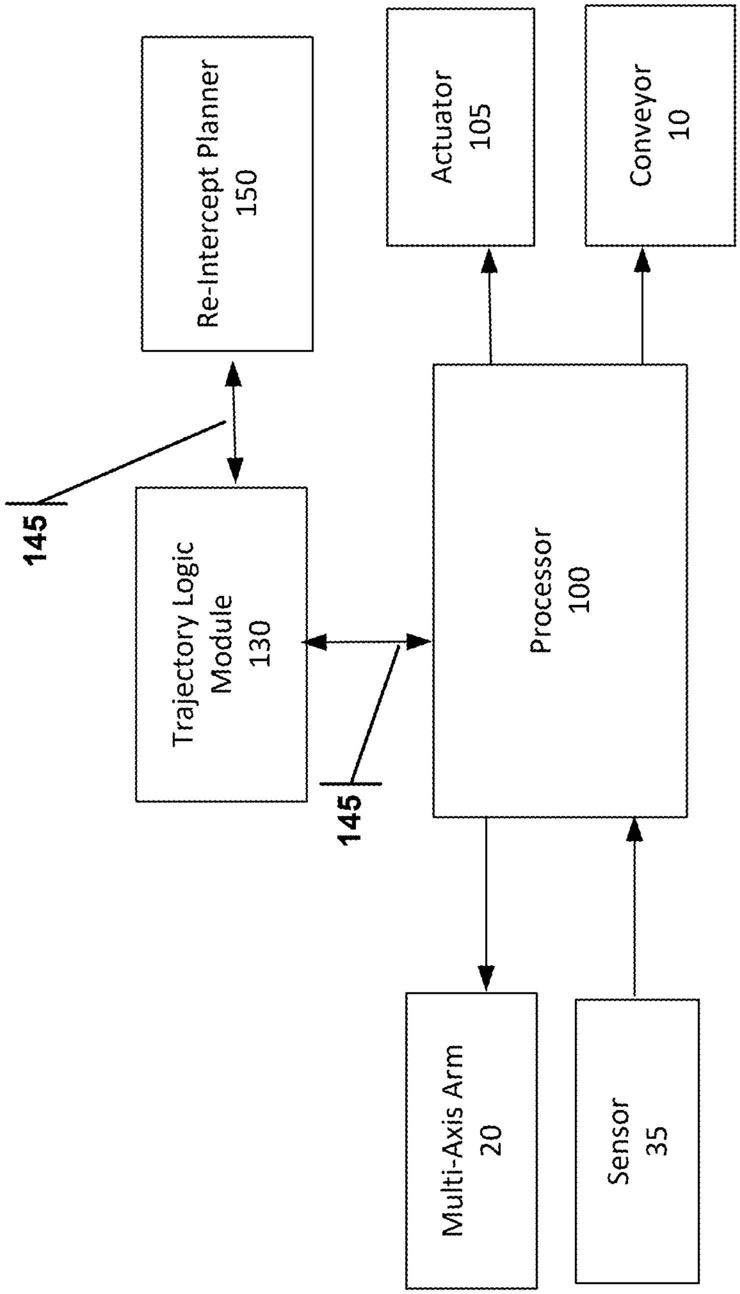
FIG. 13 is a schematic block diagram illustrating the processor and its various connections to components in the system.

As illustrated in FIG. 13, the system may utilize these non-contact cutting technologies in conjunction with a feedback loop (145). The feedback loop may receive downstream classification confidence and adjust the cutting behavior accordingly. For instance, if a cut is unsuccessful or if the bag is incorrectly identified, the processor (100) may recalculate the cutting path in real-time to optimize performance. This may ensure that the system is adaptable, efficient, and capable of handling a variety of bag types and material characteristics. In various example embodiments the system may adjust cutting parameters dynamically to improve throughput and minimize waste.

Trajectory Planning and Re-Intercept Logic

The processor (100) may be responsible for calculating and adjusting the cutting trajectory (112) for the cutting tool (25) in real-time. This calculation may be based on real-time sensor data, including the position, speed, and orientation of the flexible container (50) on the conveyor (10). The system may be configured to dynamically adjust the cutting path to accommodate varying conditions, such as different bag types, material properties, and conveyor speeds. The flexibility of the system may allow it to continuously adapt to ensure that the cutting tool engages the flexible container (50) at the optimal moment.

In various example embodiments, the processor (100) may work in conjunction with the trajectory logic module (130) to calculate intercept points where the cutting tool (25) should align with the flexible container (50). The system may dynamically calculate the relative speed of the flexible container (50) and conveyor (10) to ensure that the cutting tool aligns with the target. This functionality may be useful for maintaining cutting accuracy in high-speed material streams, as shown in FIG. 3, where the processor in various example embodiments can handle variations in material speed while maintaining precision.

If the system fails to align the cutting tool (25) with the target flexible container (50) due to unexpected movement or missed intercept points, in various example embodiments the re-intercept planner (150) may recalculate the next optimal cutting point. This re-intercept logic may allow the system to re-align the cutting tool with the flexible container (50) and make necessary adjustments to ensure a successful cut. The processor (100) may dynamically adjust the cutting trajectory (112) and recalculate the intercept point to correct the course and minimize delays. This functionality may be useful for handling unpredictable material flow and may ensure that the cutting tool remains on target, even when initial attempts fail or when the bag moves unexpectedly.

In various example embodiments the re-intercept logic (150) may work seamlessly with the dynamic trajectory adjustments to continuously optimize the system's performance. For instance, if a flexible container (50) is misaligned or moves unpredictably due to its speed or contents, the re-intercept planner (150) may help ensure the cutting tool (25) engages with the target container at the optimal time, thereby improving throughput and minimizing waste. The processor (100) may continuously update the cutting path and calculate new intercept points, to help ensure the system operates efficiently and effectively with minimal downtime.

System Feedback, Dynamic Control, and Adaptive Tooling

The disclosed system may include a dynamic feedback loop (145) that integrates real-time data from downstream sorting systems to adjust cutting behavior based on the classification confidence of the bag's contents. This feedback may allow the processor (100) to continuously refine and optimize the cutting operation. For instance, if a flexible container (50) is incorrectly identified or the cutting attempt is unsuccessful, the processor (100) may recalibrate the cutting trajectory (112) to accommodate the new data and ensure a more accurate subsequent cutting attempt. This process may minimize errors and improve the system's throughput by dynamically responding to varying conditions in the waste stream.

The feedback loop (145) may work in conjunction with the re-intercept planner (150) to further enhance the system's adaptability. If the system detects an obstruction, misalignment, or failure in the cutting attempt, the feedback from downstream classification systems may allow the processor to adjust the cutting path accordingly. In some embodiments, the feedback may also influence the tool selection logic (155), enabling the system to switch cutting tools (e.g., punch (30), blade (60), or spade (65)) in real-time based on the material type or condition detected.

The system's real-time feedback mechanism may ensure that the cutting operation adapts as material types change or as specific contents of the bag are identified. For example, if a bag contains more challenging materials, the processor (100) can trigger the re-selection of a more suitable cutting tool or adjust cutting parameters to ensure efficient and accurate cutting without causing undue damage to the bag's contents. This adaptability may help maintain high throughput while preserving material integrity.

In various configurations, the feedback loop (145) may also adjust the cutting process by optimizing the cutting trajectory (112) based on sensor data from the conveyor and sorting systems. The processor (100) may modify the cutting path in real-time, ensuring that the system remains responsive to changing conditions in the material stream. This dynamic recalibration may ensure that the system operates efficiently and minimizes delays, as it continuously adapts to the flow of materials and the contents of the flexible containers.

Example Methods of Operation

The disclosed system may operate in real-time by first detecting flexible containers, such as bags (50), within a mixed waste stream using a sensor (35). The sensor (35) may continuously monitor the position and presence of the bags (50) as they move along the conveyor (10), and the processor (100) processes this sensor data to determine the precise location of each flexible container (50) on the conveyor. Once the processor (100) identifies the bag, it may calculate the optimal cutting trajectory (112) based on real-time information, including the bag's position, speed, and orientation.

After determining the cutting trajectory, the processor (100) may work in conjunction with the multi-degree-of-freedom positioning device (20) to select the appropriate cutting tool (25). The positioning device (20) may move the cutting tool (25), which may be a punch (30), blade (60), spade (65), or motorized saw (75), for example, along the calculated trajectory to open the flexible container (50). The system may be equipped with a quick-change interface (as described in FIG. 5) that allows the easy swapping of cutting tools based on material type, bag size, or operational needs.

The actuator (105) may provide the necessary motion to move the cutting tool (25) precisely along the trajectory path.

According to various example embodiments, the cutting operation may begin when the actuator (105) moves the selected cutting tool (25) into position to cut through the flexible container (50). For tools such as the punch (30) or motorized saw (75), the actuator may apply high-speed motion to engage the cutting tool with the flexible container (50). For tools like the spade (65) or shovel (70), which may require a more controlled approach, the actuator (105) may provide the necessary force and precision to ensure an accurate cut.

In the case of non-contact cutting, the fluid nozzle (12) may expel air or water or another fluid or slurry at high pressures (e.g., at least 100 psi or 3,000 psi, respectively), to cut through the flexible container (50) without physically contacting the contents. The fluid jet (12) may be guided along the calculated cutting path, ensuring that the bag is opened without physical wear on the contents. For instance, in configurations using air, the fluid jet (12) may be used to cut plastic film from approximately 0.25 to 0.5 inches, whereas water at high pressures may be used for more aggressive cutting, providing a non-contact solution with greater clearance.

If the cutting operation is unsuccessful, or if the system fails to engage the bag properly, the re-intercept logic (150) may be applied. The processor (100) may recalculate the next intercept point based on real-time sensor data, such that the system adjusts the cutting trajectory (112) accordingly. This may allow the system to realign the cutting tool (25) with the flexible container (50) to help ensure the bag is opened properly. This re-intercept logic ensures that missed cuts or unpredictable movements do not disrupt the flow of operations, improving throughput and efficiency.

The system may also incorporate dynamic feedback from downstream sorting systems to continuously optimize the cutting operation. As feedback regarding classification confidence and bag identification is received, the processor (100) may adjust the cutting path in real-time, allowing the system to handle a variety of materials and bag types. In some configurations, the tool selection logic (155) may be used to swap cutting tools depending on the material characteristics, ensuring optimal cutting performance for each bag.

Such step-by-step methods according to various example embodiments may allow for flexible, high-speed operation capable of handling mixed waste streams, adjusting dynamically to varying bag types, materials, and sizes, while ensuring efficient, non-destructive bag opening.

Figure 14:
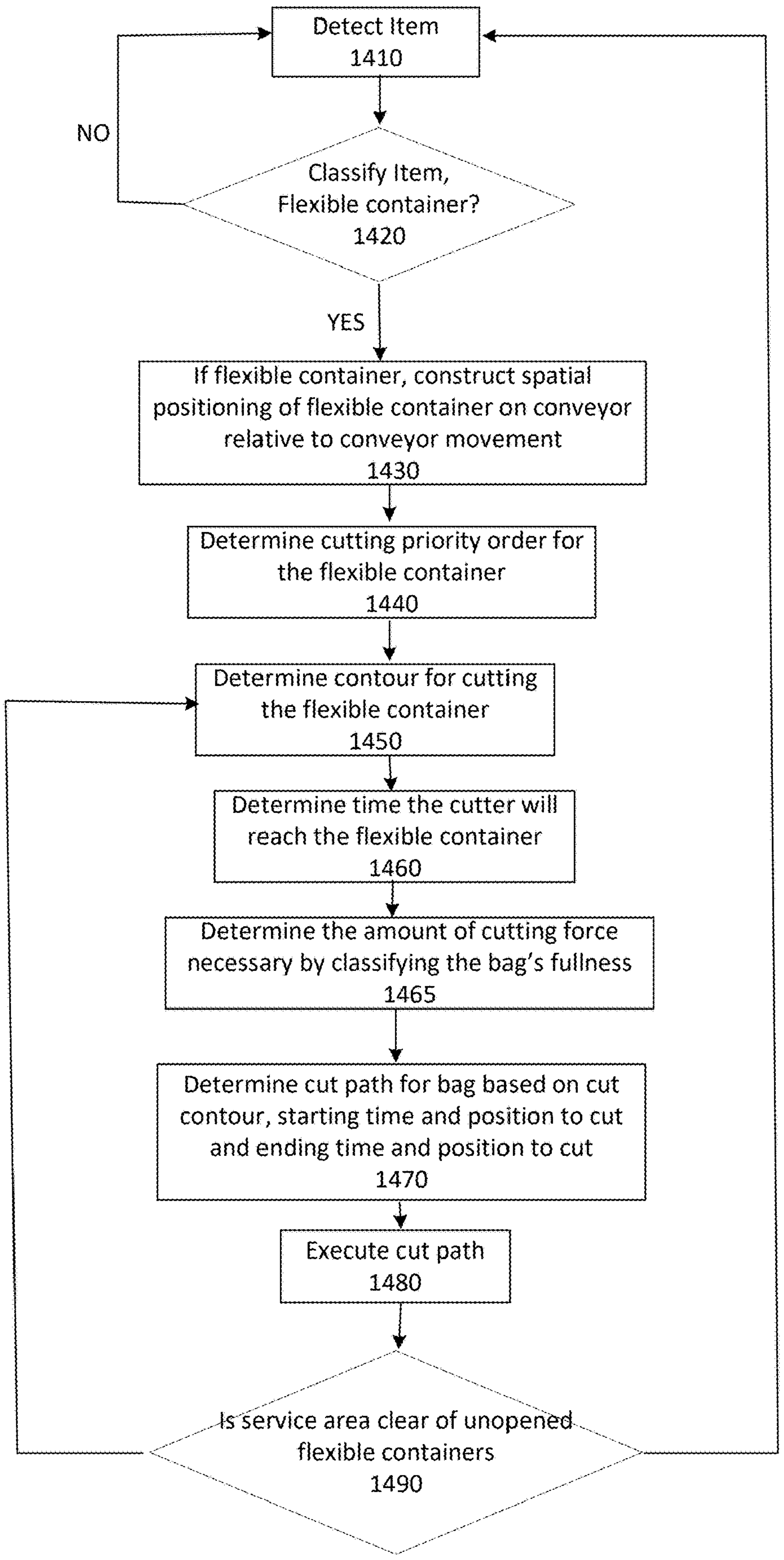
FIG. 14 is a flowchart depicting example steps in a process for detecting and cutting flexible containers.

For example, FIG. 14 illustrates a flowchart outlining an example process 1400 for detecting and cutting flexible containers, such as plastic bags, within a mixed waste stream. The process 1400 begins with Step 1410—Detect item on a conveyor device, where the sensor (35) detects the presence of an item on the conveyor (10). The processor (100) then processes the sensor data to determine if the item is a flexible container. This is performed in Step 1420—Classify item as flexible container or not.

If the item is classified as a flexible container, Step 1430—Construct spatial positioning of flexible container on conveyor relative to conveyor movement follows. The system determines the precise position of the flexible container (50) on the conveyor (10) in relation to the movement of the conveyor, ensuring the cutting mechanism is aligned to the container's location. This leads to Step 1440—Determine cutting priority order for flexible container, where the processor (100) assigns a priority to the container, determining which bags should be cut first, based on predefined factors like size, material, and urgency.

Step 1450—Determine a contour for cutting the flexible container follows, in which the processor (100) calculates the cutting path for the flexible container (50), ensuring that the cut will open the container without damaging its contents. This information is used for Step 1460—Determine time the cutter will reach the flexible container, where the processor (100) calculates when the cutting tool (25) will align with the flexible container (50), taking into account the speed of the conveyor (10) and the positioning of the cutting tool.

Once the cutting timing is determined, Step 1465—Determine the amount of cutting force necessary by classifying the bag's fullness. The processor (100), based on the sensor data, may determine whether the flexible container is full or not full because this may affect the amount of cutting force necessary. If, for example, the flexible container is very full, then the container is under tension and the cutting force necessary may be less than if the container is somewhat empty.

After the cutting force is determined, Step 1470—Determine cut path for bag based on cut contour, starting time and position to cut, and ending time and position to cut follows. The processor (100) calculates the precise cutting path, accounting for the time it will take for the cutting tool (25) to reach the bag and complete the cut. The cutting tool (25) follows this calculated path to ensure the optimal cut is made.

After the cut path is completed, Step 1480—Execute cut path is triggered, wherein the positioning device (20), assisted by the actuator (105), moves the cutting tool (25) along the path determined in Step 1470, cutting through the bag (50) according to the planned trajectory.

Once the cutting process 1400 has completed, Step 1490—Determine whether service area is clear of unopened flexible containers is checked. The system assesses whether there are any bags still present that require cutting. If there are unopened flexible containers, the flow returns to an earlier step, such as Step 1440 or Step 1460, for further cutting operations. If there are no sensed unopened flexible containers, the flow returns to Step 1410 and the process 1400 repeats. This is illustrated by the feedback loop and flow arrows in FIG. 14 indicating a cyclical process.

The arrows connecting the steps in FIG. 14 depict the logical flow between different stages of the process. For example, after Step 1410 (item detection), if the item is classified as a flexible container, the process moves forward through the following steps: Step 1430, Step 1440, and so on. If a bag is not classified as a flexible container in Step 1420, the flow branches off and skips subsequent cutting steps, as shown by the branching arrow leading to the end of the process. After each cut is completed in Step 1480, the system checks if the service area is clear in Step 1490, ensuring that the system proceeds to re-prioritize or perform another cut if necessary, as represented by the feedback loop arrow.

Throughout this entire process, the processor (100) is continuously adjusting cutting operations in real time, responding to sensor data and recalculating the cutting trajectory as needed. The feedback loop (145) integrates downstream data to further refine the cutting behavior, ensuring optimal performance and adaptability. If an obstruction is detected or if the bag is incorrectly identified, the system may re-intercept and recalculate cutting parameters, as depicted in the flowchart. Additional example steps taken in various example embodiments are further described below.

Sensor Data Processing: The system may utilize a sensor (35) to detect the presence and position of the flexible container (50) on the conveyor (10). In some configurations, the sensor (35) may include a LIDAR-based profiling sensor or a visual camera. The processor (100) may process the sensor data to determine the precise location of the flexible container (50) on the conveyor and calculate a cutting path to ensure the cutting tool (25) aligns accurately with the bag at the optimal time.

Trajectory Calculation: The processor (100) may calculate the cutting trajectory for opening the flexible container (50). The trajectory may be based on real-time data received from the sensor (35) regarding the bag's position, speed, orientation, and other factors that may affect the cutting path. In some embodiments, the processor (100) may calculate intercept points based on the relative speed of the flexible container (50) and conveyor (10), ensuring that the cutting tool (25) can engage the flexible container (50) at the optimal moment. This may allow the system to dynamically adjust cutting paths based on real-time changes in the material stream.

Cutting Tool Selection: Based on the calculated trajectory, the system may determine the cutting tool (25) that may be most suitable for the current bag type or material. In various example embodiments, the cutting tool (25) may include a punch (30), blade (60), spade (65), shovel (70), or motorized saw (75), depending on factors such as material type and toughness, bag thickness, and speed or other operational requirements such as the precision required for the operation.

A punch tool (30) may be particularly suitable for piercing thinner or more flexible materials, where a precise, linear insertion is needed to open the flexible container (50) without damaging its contents. The punch may also be ideal when fast, high-speed motion is needed to quickly puncture and slice through the material without excessive resistance.

A blade (60), on the other hand, may be well-suited for cutting through medium-thickness materials, where a clean cut is needed. It may be selected when precise cuts are required, and the material is neither too tough nor too delicate. The blade may also be beneficial in situations where accuracy and alignment throughout the cutting process are critical, as the blade housing (115) supports the cutting tool and ensures it remains in place during operation.

A spade-shaped tool (65) may be used for larger, thicker bags where a wider cutting surface is beneficial. This tool can provide a broader cut to open thicker bags more efficiently, and it may be particularly useful when the flexible container (50) contains materials that are more resistant to cutting. The spade edge (116) may ensure effective cutting action across a variety of bag types, and this tool may allow for faster processing of bags with more robust contents.

A shovel tool (70) may be used in cases where greater penetration depth (120) is required. This tool can be positioned above the bag and engaged through the material to create a smooth incision with minimal resistance. The shovel blade (118) may be particularly advantageous when opening larger bags quickly and efficiently, especially when material resistance could otherwise slow down the cutting operation. This tool may be ideal when speed is essential, and the flexible container (50) is large or contains a variety of materials.

For particularly tougher or more resistant bag materials, a motorized rotating cutter (75), shown in FIG. 12, may be used. This tool may be powered by a drive housing (125) and provides higher cutting force, making it useful for high-throughput environments where faster and more powerful cutting action is needed. The motorized saw may also be preferred when cutting through thicker bags or materials that are not easily handled by a blade or fluid jet alone. This tool provides greater cutting efficiency, particularly when working with high-density or reinforced materials.

The system may also employ non-contact cutting technologies such as fluid jets (e.g., air or water), which can be used in situations where it is essential to preserve the contents of the flexible container (50) and avoid physical contact. Such tools may be useful for more delicate materials or when maintaining separation between the cutting tool and the bag is required.

A positioning device (20) may be equipped with a quick-change interface (as described in FIG. 5) that may allow for easy swapping of the cutting tools based on material type and operational needs.

Cutting Operation: Once the optimal cutting path is calculated, and the correct cutting tool is selected, the positioning device (20), in conjunction with the actuator (105), may move the cutting tool (25) along the calculated trajectory. The actuator (105) may control the cutting tool's movement and allow for precise, high-speed motion, ensuring that the cutting tool (25) cuts along the trajectory with minimal deviation. In some embodiments, a pneumatic actuator (105) may be used for fast motion, while a hydraulic actuator (105) may be employed for tougher cutting tasks requiring greater force. The linear actuator (105) provides controlled, precise forward-and-backward movement, making it ideal for piercing tools like the punch (30). The actuator may be adjustable such that it can effectively cut through the flexible container. For example, based on the amount the flexible container is filed the amount of force exerted by the actuator may be adjusted—for containers that are close-to-empty, the amount of actuator force (i.e., cutting force) may be greater than for containers that are filled.

Non-Contact Cutting (Fluid Jets): In various example embodiments, the system may also utilize non-contact cutting technologies such as high-pressure fluid jets. The high-pressure fluid nozzle (12) may expel compressed air (10) or water (12) at high pressures, such as 100 psi or 3,000 psi, to cut through the plastic flexible container (50) without physically contacting the bag's contents. This method ensures that the material inside the bag remains intact while still allowing for efficient cutting of the bag's surface. The fluid jet may be used in applications where high-speed, non-contact cutting is required.

Cutting Path Optimization: The processor (100) may dynamically adjust the cutting trajectory based on feedback from the sensor (35) and real-time calculations. If the cutting path becomes misaligned due to a change in the bag's position, the processor may recalculate the optimal cutting path to compensate for the shift. The system may be configured to respond to changing conditions, such as variations in bag speed or material type, ensuring accurate and efficient bag opening.

System Feedback and Dynamic Recalibration: The system may be responsive to real-time feedback from downstream sorting systems, which may help to refine the system's cutting behavior. If a cutting attempt is unsuccessful or if the system detects an obstruction, the processor may recalculate the cutting path and adjust the cutting tool (25) accordingly. The feedback loop (145) may allow for dynamic recalibration of the system, enabling it to adapt in real-time to varying conditions in the waste stream. For example, if a flexible container (50) is not properly identified or if the cut is incorrect, the system can attempt the cut again using re-intercept logic (150), as described in the system configuration.

Re-Intercept Logic: If the system detects that the cutting tool (25) has missed its target or if the flexible container (50) moves unpredictably, the re-intercept planner (150) may recalculate a new optimal cutting point, ensuring that the system re-aligns the cutting tool (25) with the flexible container (50). The processor (100) may dynamically adjust the cutting trajectory (112) and recalculate the next intercept point, ensuring minimal downtime and more efficient bag opening.

Tool Adaptation and Feedback Integration: In some cases, the system may need to swap cutting tools in real-time depending on the type of material inside the flexible container (50). The tool selection logic (155) may allow the system to assess the material and choose an appropriate cutting tool, whether it's the punch (30), spade (65), motorized saw (75), or fluid nozzle (12). This adaptability ensures that the system optimizes performance based on the material type and adjusts the cutting process dynamically.

Alternative Cutting Tools and Configurations

In some example embodiments, motorized blades (75) or reciprocating saws (not shown) may be used for tougher materials. These tools may be powered by drive housings (125) and may be capable of cutting through more robust bags or materials that might not be easily cut by a standard blade (60) or fluid jet (12). The motorized rotating cutter (75) in FIG. 12 may represent one example of this embodiment. This setup may provide a more powerful cutting force than manual or passive cutting tools, increasing efficiency in high-throughput environments.

System Features and Optimization

In various example embodiments, the disclosed system may be capable of handling high-speed mixed waste streams without causing material degradation or excessive jamming. The system may dynamically adjust the cutting trajectory in response to real-time data from sensors (35), enabling quick, accurate, and efficient bag opening. The feedback loop (145) may ensure that the system continually improves its performance based on downstream sorting data, as shown in FIG. 13, where the feedback loop (145) may allow for system recalibration.

Additional Hardware & Software Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in. one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "'processor", "computer." "data processing apparatus", and the like encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, code, program code, and the like) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory' or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory' devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry'.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensor feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a backend component, e.g., as an information/data server, or that includes a middleware component, e.g., an application server, or that includes a frontend component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e g., the Internet), and peer-to-peer networks (e.g., ad hoc peer-to-peer networks).

The computing system can include clients and servers. A client and server are generally remote from each other and typically interact through a communication network, the relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations arc depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and the described program components and systems can generally be integrated together in a single software product or packaged into multiple software products.

Thus, embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and case of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "program code," "computer program(s)", "computer code(s)." and the like. The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various example embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "'a," "'an," and "'the" include plural references unless the context clearly indicates otherwise. Thus, for example, reference to "a cable" includes a single cable as well as a bundle of two or more different cables, and the like.

The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes, parameters, etc., to provide a thorough understanding of the present invention. The particular features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number±10%, such that "about 10" would include from 9 to 11. In other exemplary embodiments, the term "about" may include the recited number±X %, where X is considered the normal variation in said measurement by one of ordinary skill in the art.

Features which are described in the context of separate embodiments may also be provided in combination in a single embodiment. Conversely, various features which are, for brevity, described in the context of a single embodiment, may also be provided separately or in any suitable sub-combination, the applicant hereby gives notice that new claims may be formulated to such features and/or combinations of such features during the prosecution of the present application or of any further application derived therefrom. Features of the transitory physical storage medium described may be incorporated into or used in a corresponding method, digital documentation system andor system, and vice versa. Accordingly, the structural and functional components described herein may be rearranged, combined, or separated to form alternative embodiments, including method-based, apparatus-based, and computer-implemented configurations. Unless otherwise noted, any claim element described as a hardware component may alternatively be implemented as software, and vice versa, to the extent technically feasible. For example, in various example embodiments, certain system components may be implemented entirely in software, including sensor emulation, retrospective data analysis, or inference replay. The core signal processing and decision support logic may be hosted on tablets, smartphones, or cloud platforms without requiring a physical base unit, thereby enabling deployment in low-resource settings or for retrospective clinical research. Likewise, in various implementations, the respiratory analysis algorithms, machine learning models, and control logic described herein may be embodied as software instructions stored on a non-transitory computer-readable medium and executed by one or more processors. The code may include embedded firmware, containerized services, or downloadable mobile applications, and may operate on local processors within the base unit or wearable sensor, or remotely via cloud infrastructure.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, which is defined by the claims.

The invention claimed is:

1. A system, comprising:

a conveyor configured to transport a heterogeneous mixture of materials including at least one flexible container;

a sensor configured to detect the presence and position of the at least one flexible container on the conveyor;

a multi-degree-of-freedom positioning device configured to move a cutting tool relative to the conveyor; and a processor in communication with the sensor and the positioning device, the processor configured to:

process sensor data to locate the flexible container;

generate a profile of the flexible container and determine a cutting contour along a surface of the flexible container;

determine a cutting trajectory based on the cutting contour, wherein the cutting trajectory maintains a clearance from underlying contents of the flexible container; and control the positioning device to execute the cutting trajectory to cut a material of the flexible container along the cutting contour to open the flexible container while avoiding damage to contents of the flexible container.

2. The system of claim 1, wherein the sensor comprises a LIDAR-based profiling sensor.

3. The system of claim 1, wherein the sensor comprises a visual camera configured to connect to a classifier trained to recognize flexible containers.

4. The system of claim 1, wherein the sensor is configured as a hybrid visual and profiling sensor unit.

5. The system of claim 1, wherein the positioning device further comprises a quick-change interface configured to mount different cutting tools.

6. The system of claim 1, wherein the processor is further configured to select the cutting tool based on characteristics of the flexible container.

7. The system of claim 1, wherein the processor is further configured to detect an obstruction and halt movement of the cutting tool.

8. The system of claim 1, wherein the processor is further configured to prioritize cutting of the flexible container based on height relative to the conveyor.

9. The system of claim 1, wherein the cutting trajectory is an intercept-based trajectory determined based on a speed of the conveyor- and a deformable profile of the flexible container, wherein the processor is further configured to dynamically adjust the cutting trajectory to avoid contact with rigid objects in the heterogeneous mixture.

10. The system of claim 1, wherein the processor is further configured to dynamically adjust the cutting trajectory in real-time based on changing sensor input.

11. The system of claim 1, wherein the processor is further configured to dynamically adjust the cutting force of the cutting tool based on the sensor data.

12. The system of claim 1, wherein the cutting tool is configured to open the flexible container without physical contact with a surface of the flexible container, and wherein the processor maintains a clearance between the cutting tool and the surface of the flexible container during the cutting operation.

13. The system of claim 1, wherein the cutting tool comprises a high-pressure fluid nozzle.

14. The system of claim 13, wherein the high-pressure fluid comprises a suspended cutting medium.

15. The system of claim 1, wherein the system is configured to maintain a clearance from the cutting tool to a surface of the flexible container of less than 0.5 inches.

16. The system of claim 1, further comprising a blower configured to pretension a surface of the flexible container prior to cutting.

17. The system of claim 1, wherein the system is configured to prevent fouling of the cutting tool using a directed air stream synchronized with cutting tool retraction.

18. The system of claim 1, further comprising a feedback loop configured to receive downstream classification confidence and adjust cutting behavior.

19. The system of claim 1, wherein the cutting tool is configured to perform cutting without physical contact with the flexible container.

20. A method for opening flexible containers in a waste processing stream, comprising:

conveying a heterogeneous mixture of materials in a mixed solid waste stream including at least one flexible container on a conveyor;

using a sensor to detect a presence and position of the flexible container and generate a profile of the flexible container;

calculating a cutting trajectory for the flexible container based on a cutting contour derived from the profile;

directing a multi-degree-of-freedom positioning device to move a cutting tool along the cutting trajectory; and opening the flexible container- by cutting material of the flexible container along the cutting contour while avoiding damage to contents of the flexible container.

21. The method of claim 20, wherein the cutting tool is a high-pressure fluid jet.

22. The method of claim 20, further comprising directing a blower to pretension a surface of the flexible container before cutting.

23. The method of claim 20, further comprising calculating and executing a re-intercept trajectory if a first cutting attempt fails.

24. The method of claim 20, wherein the cutting trajectory avoids any contact with a surface of the flexible container.

25. The method of claim 20, wherein the positioning device is guided based on both static sensor data and dynamic motion prediction.

* * * * *